(12) United States Patent
Makii et al.

(10) Patent No.: US 11,069,317 B2
(45) Date of Patent: Jul. 20, 2021

(54) DISPLAY DEVICE

(71) Applicant: Sharp Kabushiki Kaisha, Sakai (JP)

(72) Inventors: Toshiyuki Makii, Sakai (JP); Nobuyuki Hashimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/856,580

(22) Filed: Apr. 23, 2020

(65) Prior Publication Data

US 2020/0342827 A1    Oct. 29, 2020

Related U.S. Application Data (60) Provisional application No. 62/838,988, filed on Apr. 26, 2019.

(51) Int. Cl.
*G09G 3/36* (2006.01)
*G02F 1/1362* (2006.01)

(52) U.S. Cl.
CPC ..... *G09G 3/3677* (2013.01); *G02F 1/136286* (2013.01); *G09G 2300/0426* (2013.01)

(58) Field of Classification Search
CPC .. G09G 3/3275; G09G 3/3685; G09G 3/3688; G09G 3/3677; G09G 3/3674; G09G 2310/0297
See application file for complete search history.

(56) References Cited

U.S. PATENT DOCUMENTS

| | | | | |
|---|---|---|---|---|
| 2009/0189835 A1* | 7/2009 | Kim | ...... | G09G 3/3677 345/80 |
| 2012/0194773 A1* | 8/2012 | Kim | ...... | G09G 3/3674 349/139 |
| 2015/0199936 A1* | 7/2015 | Watanabe | ...... | G09G 3/3685 345/100 |
| 2016/0086533 A1* | 3/2016 | Song | ...... | H01L 27/3288 345/80 |
| 2016/0247478 A1* | 8/2016 | Ishige | ...... | G09G 3/3677 |
| 2017/0219895 A1* | 8/2017 | Yu | ...... | G02F 1/1368 |
| 2019/0259345 A1* | 8/2019 | Hosoyachi | ...... | G02F 1/13454 |
| 2019/0325827 A1* | 10/2019 | Lee | ...... | G09G 3/3225 |
| 2019/0340974 A1* | 11/2019 | Ka | ...... | G09G 3/3225 |

(Continued)

FOREIGN PATENT DOCUMENTS

JP    2013-238829 A    11/2013

*Primary Examiner* — Sepehr Azari (74) *Attorney, Agent, or Firm* — Keating & Bennett, LLP (57) ABSTRACT

A display device includes: a plurality of first pixel sections; a plurality of second pixel sections; first image lines disposed in a first pixel area; a plurality of second image lines disposed in a second pixel area; short-circuit lines connected to the second image lines, the short-circuit lines short-circuiting the second image lines; a first pixel drive unit driving the first pixel sections; a plurality of second pixel drive units driving the second pixel sections arranged side by side along a row direction by time division while the first pixel drive unit is driving the first pixel sections; and an image signal supply section supplying first image signals to the first image lines in synchronism with the first pixel drive unit driving the first pixel sections and supplying second image signals to the short-circuit lines by time division in synchronism with the second pixel drive units driving the second pixel sections arranged side by side along the row direction.

5 Claims, 6 Drawing Sheets (56) References Cited

U.S. PATENT DOCUMENTS

2019/0377234 A1\* 12/2019 Yu .................... H01L 27/1218
2020/0074955 A1\* 3/2020 Fujikawa ............... G09G 3/006
2020/0342827 A1\* 10/2020 Makii .................. G09G 3/3677

\* cited by examiner

DISPLAY DEVICE

TECHNICAL FIELD

The disclosure relates to a display device.

BACKGROUND ART

The liquid crystal display device described in Patent Literature 1 described below has been conventionally known as an exemplary liquid crystal display device. The liquid crystal display device described in Patent Literature 1 includes: a display area in which a plurality of rows of gate lines and a plurality of columns of signal lines are arranged in a matrix shape on a substrate, and pixels are disposed at intersections of these gate and signal lines; source circuits around the display area to supply signals to the signal lines; and a plurality of selectors sequentially supplying signals from the source circuits to a set of signal lines of the signal lines by time division, each set of signal lines containing a prescribed number of signal lines. The display area has a trapezoidal planar shape where a first side (lower base) is shorter in length than a second side (upper base). Some of the selectors are configured to be disposed around the first side and the other selectors are configured to be disposed around the second side.

In the liquid crystal display device described in Patent Literature 1, it is possible to suppress an increase in a frame region with respect to the first side where the source circuits are disposed. However, an increase in a frame region with respect to the second side is concerned because some selectors are disposed with respect to the second side.

CITATION LIST

Patent Literature

Patent Literature 1: Japanese Unexamined Patent Application Publication, Tokukai, No. 2013-238829

SUMMARY (1) An embodiment of the disclosure is directed to a display device including: a plurality of first pixel sections arranged side by side at least along a column direction; a plurality of second pixel sections arranged along a row direction and the column direction in a second pixel area located on an end side relative to a first pixel area with respect to the row direction, the first pixel sections being disposed in the first pixel area; first image lines disposed in the first pixel area, the first image lines being connected to the first pixel sections arranged side by side along the column direction in the first pixel area; a plurality of second image lines disposed in the second pixel area, the second image lines being connected to the second pixel sections arranged side by side along the column direction or one of the second pixel sections; short-circuit lines connected to the second image lines, the short-circuit lines short-circuiting the second image lines; a first pixel drive unit disposed in the first pixel area, the first pixel drive unit driving the first pixel sections; a plurality of second pixel drive units disposed in the second pixel area, the second pixel drive units driving the second pixel sections arranged side by side along the row direction by time division while the first pixel drive unit is driving the first pixel sections; and an image signal supply section connected to the first image lines and the short-circuit lines, the image signal supply section supplying first image signals to the first image lines in synchronism with the first pixel drive unit driving the first pixel sections and supplying second image signals to the short-circuit lines by time division in synchronism with the second pixel drive units driving the second pixel sections arranged side by side along the row direction.

(2) An embodiment of the disclosure is directed to a display device configured as in (1) above in which the second pixel sections are disposed such that a number of arranged second pixel sections with respect to the column direction decreases on moving toward an end side with respect to the row direction.

(3) An embodiment of the disclosure is directed to a display device configured as in (2) above in which the second pixel sections are disposed such that a number of arranged second pixel sections with respect to the row direction decreases on moving toward the image signal supply section with respect to the column direction.

(4) An embodiment of the disclosure is directed to a display device configured as in (2) or (3) above in which the second pixel sections are disposed such that the second pixel area is divided into two areas sandwiching the first pixel area with respect to the row direction.

(5) An embodiment of the disclosure is directed to a display device configured as in any one of (1) to (4) above in which the first pixel sections are arranged side by side along the row direction in the first pixel area, and the first pixel drive unit collectively drives the first pixel sections arranged side by side along the row direction.

DESCRIPTION OF EMBODIMENTS

Embodiment 1

A description will be given of Embodiment 1 of the disclosure with reference to FIGS. 1 to 5, by taking a liquid crystal display device (display device) 10 as an example. Some of the figures show a common set of an X axis, a Y axis, and a Z axis and are drawn to match these axes.

Figure 1:
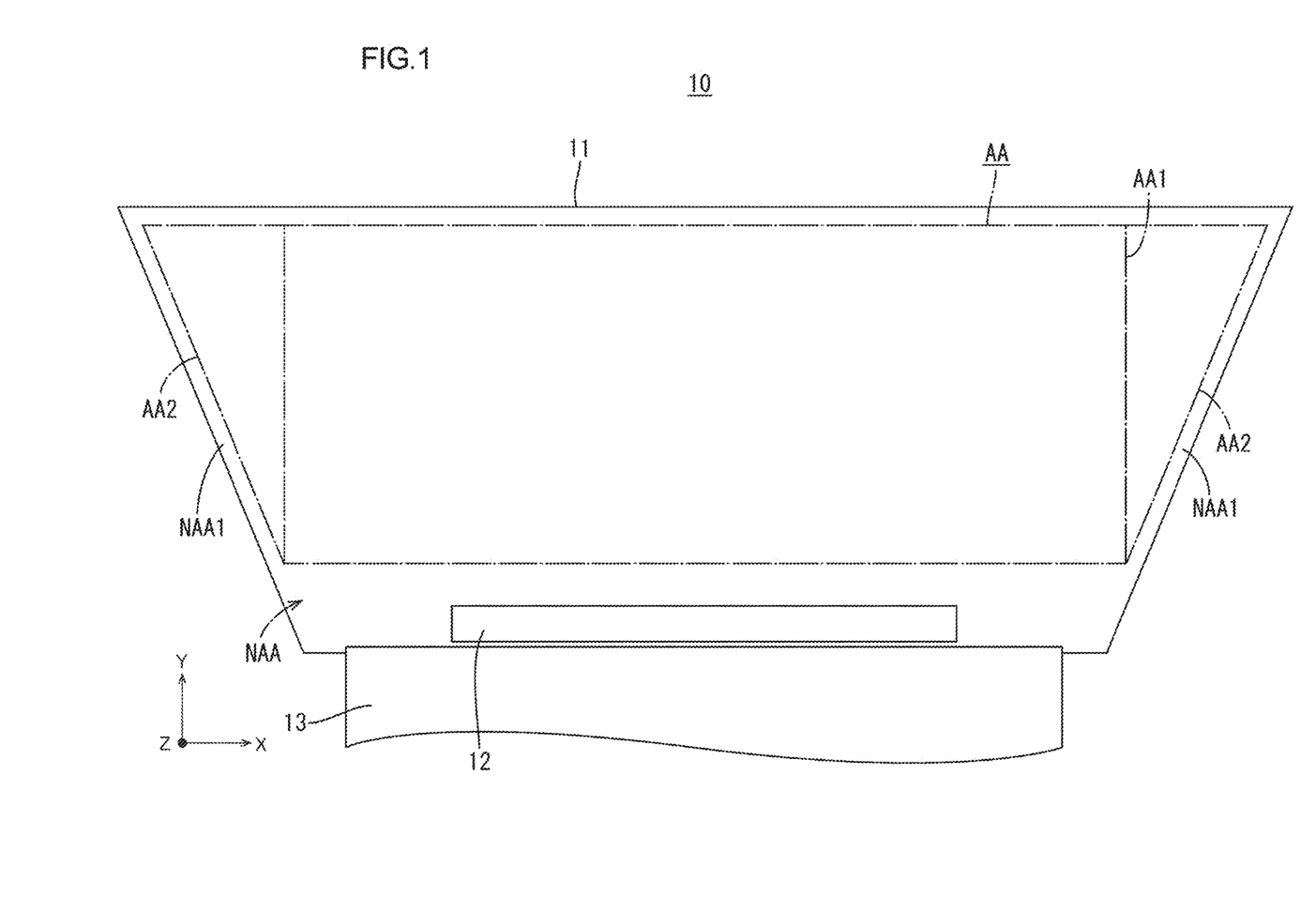
FIG. 1 is a plan view of a liquid crystal panel included in a liquid crystal display device in accordance with Embodiment 1 of the disclosure.

The liquid crystal display device 10, as shown in FIG. 1, includes at least a liquid crystal panel (display panel) 11 capable of displaying images and a backlight device (illumination device) irradiating light on the liquid crystal panel 11 for use in display. As shown in FIG. 1, the liquid crystal panel 11 is shaped like a horizontally elongated reverse isosceles trapezoid in a plan view and may be described as having an irregular shape (non-rectangular shape) that is not a typical quadrilateral shape. The liquid crystal panel 11 is structured such that the long sides thereof lie in the X-axis direction and the short sides thereof lie in the Y-axis direction. The liquid crystal display device 10, including the liquid crystal panel 11 having such a planar shape, is used, for example, in a rearview mirror monitor on an automobile. The backlight device, not described in detail here, has a known structure that includes a light source, an optical sheet, and the like.

The liquid crystal panel 11, as shown in FIG. 1, has a display area AA at the central part of the screen and a non-display area NAA at the peripheral end part of the screen surrounding the display area AA. The display area AA is capable of displaying images, whereas the non-display area NAA is not capable of displaying images. The display area AA is shaped like a horizontally elongated reverse isosceles trapezoid in a plan view in accordance with the planar shape of the liquid crystal panel 11. The non-display area NAA is shaped like a reverse trapezoid and provides a frame around the display area AA. In other words, the non-display area NAA forms a frame part of the display area AA. The non-display area NAA has a pair of bases. In the shorter one of the bases (lower end in FIG. 1), a driver (image signal supply section) 12 and a flexible substrate 13 are mounted. The driver 12 is composed of an LSI chip including a drive circuit therein, and can process various signals transferred by the flexible substrate 13 and supply the processed signals to the display area AA. The flexible substrate 13 includes a pattern of several wirings on an insulating and flexible base member and is connected to the liquid crystal panel 11 and a control board (signal supply source), thereby transferring various signals output from the control board to the liquid crystal panel 11.

The display area AA of the liquid crystal panel 11 is, as shown in FIG. 1, divided into a first pixel area AA1 located on the center side with respect to the X-axis direction and two second pixel areas AA2 located on the end sides with respect to the X-axis direction. The X-axis direction coincides with the long side direction of the display area AA. The first pixel area AA1 is shaped like a rectangle, more particularly, like a square, in a plan view. The second pixel areas AA2 sandwich the first pixel area AA1 with respect to the X-axis direction. Each second pixel area AA2 is shaped like a triangle, more particularly, like a right triangle, in a plan view. The two second pixel areas AA2 are symmetric with respect to the axis of symmetry that passes through the middle positions in the first pixel area AA1 with respect to the X-axis direction. The frame portion of each second pixel area AA2 in the non-display area NAA includes an inclined portion NAA1. The inclined portion NAA1 extends obliquely with respect to the X- and Y-axis directions. The inclined portion NAA1 is located closer to the driver 12 than is the second pixel area AA2 with respect to the Y-axis direction.

Figure 2:
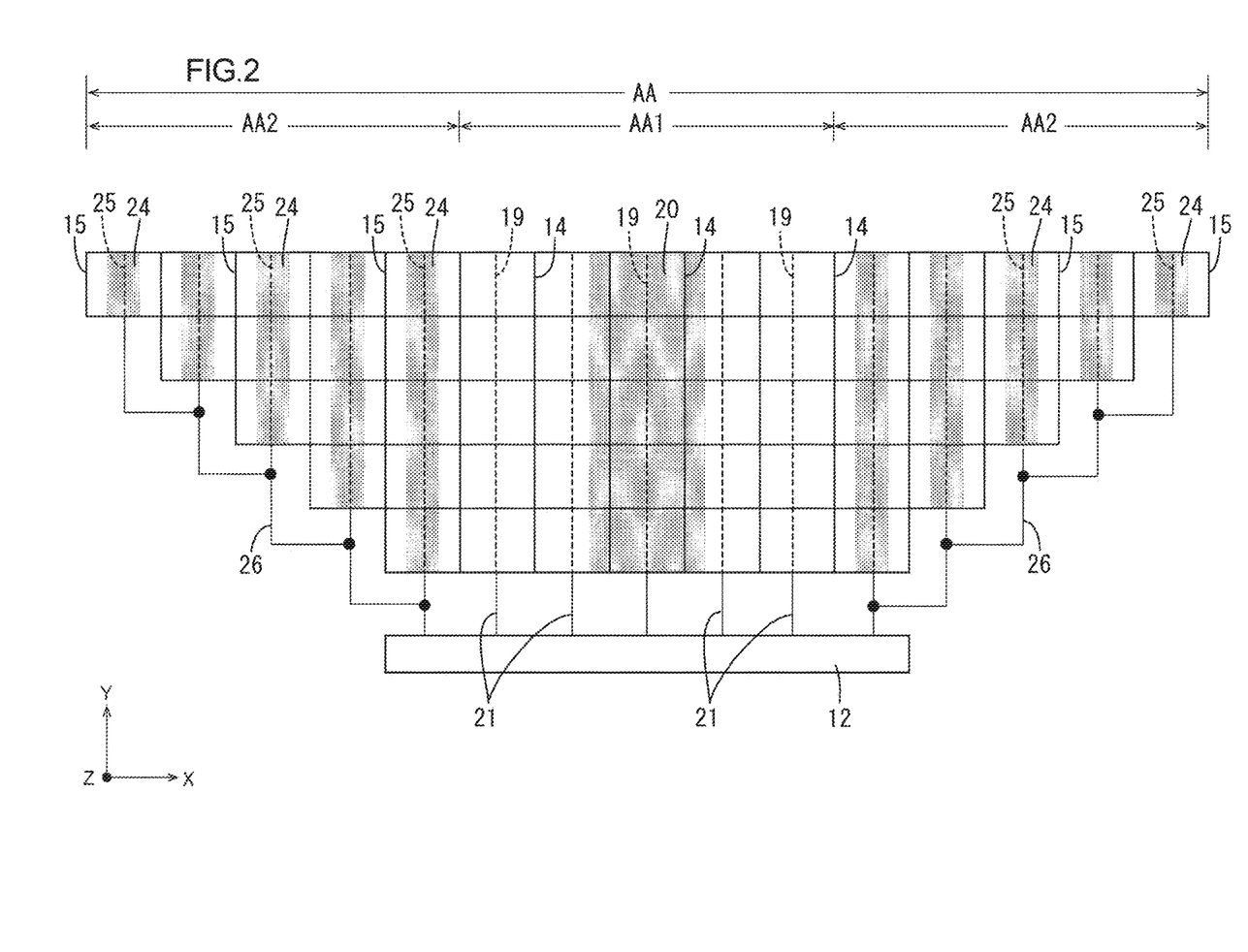
FIG. 2 is a plan view showing, for example, an arrangement of pixel sections included in the liquid crystal panel.

In the display area AA, there are provided first pixel sections 14 and second pixel sections 15, each of which is a unit of display for displaying an image, as shown in FIG. 2. The first pixel sections 14 are disposed in the first pixel area AA1, and the second pixel sections 15 are disposed in the second pixel areas AA2. Some of the first pixel sections 14 and the second pixel sections 15 give off a red color, some others give off a green color, and the others give off a blue color, so that the display area AA can display color images. In the first pixel area AA1, a plurality of first pixel sections 14 are arranged side by side along the X-axis direction (row direction) and the Y-axis direction (column direction) to form a matrix shape. The number of arranged first pixel sections 14 with respect to the X-axis direction and the number of arranged first pixel sections 14 with respect to the Y-axis direction are fixed. Specifically, in the present embodiment, FIG. 2 shows a typical example where the number of arranged first pixel sections 14 with respect to the X-axis direction, that is, the number of first pixel sections 14 constituting one first pixel sections row, is equal to 5, whereas the number of arranged first pixel sections 14 with respect to the Y-axis direction, that is, the number of first pixel sections 14 constituting one first pixel sections column, is equal to 5. In contrast, in the second pixel areas AA2, a plurality of second pixel sections 15 are arranged side by side along the X-axis direction and the Y-axis direction to form a matrix shape. The number of arranged second pixel sections 15 with respect to the X-axis direction and the number of arranged second pixel sections 15 with respect to the Y-axis direction are not fixed. Specifically, in the present embodiment, FIG. 2 shows a typical example where the number of arranged second pixel sections 15 with respect to the X-axis direction, that is, the number of second pixel sections 15 constituting one second pixel sections row, decreases on moving toward the driver 12 with respect to the Y-axis direction and conversely, increases on moving away from the driver 12, between a maximum value of 5 and a minimum value of 1. In the present embodiment, FIG. 2 also shows a typical example where the number of arranged second pixel sections 15 with respect to the Y-axis direction, that is, the number of second pixel sections 15 constituting one second pixel sections column, decreases on moving toward an X-axis end (i.e., on moving away from the first pixel area AA1) and conversely, increases on moving toward the X-axis middle (i.e., on moving toward the first pixel area AA1), between a maximum value of 5 and a minimum value of 1.

Figure 3:
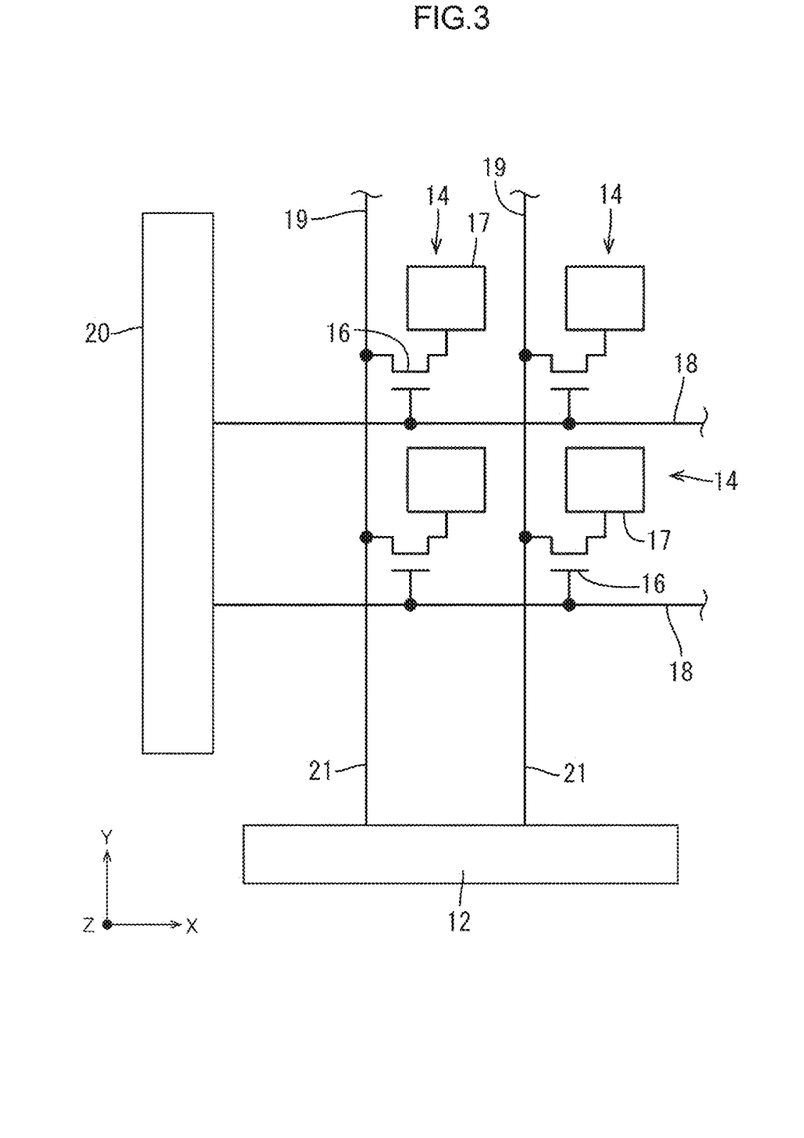
FIG. 3 is a circuit diagram of first pixel sections disposed in a first pixel area in a display area of the liquid crystal panel.

The liquid crystal panel 11 includes: an array substrate including the driver 12 and the pixel sections 14 and 15 and further including wirings and the like connected to the driver 12 and the pixel sections 14 and 15; a CF substrate (opposite substrate) attached to the array substrate in such a manner that the CF substrate sits opposite the array substrate; and a liquid crystal layer interposed between the substrates. The following will describe in detail a structure of the array substrate. First, each first pixel section 14 included in the array substrate includes a first TFT 16 that is a switching element and a first pixel electrode 17 connected to a drain electrode of the first TFT 16 as shown in FIG. 3. FIG. 3 shows, as an example, some of the first pixel sections 14 disposed in the first pixel area AA1. The first TFT 16 has a known structure including a gate electrode, a source electrode, a drain electrode, and a channel section that is composed of a semiconductor material intervening between the source electrode and the drain electrode, so that whether conduction in the channel section is possible or not can be controlled on the basis of a signal supplied to the gate electrode. The first pixel electrode 17 is composed of a transparent electrode material and is capable of being charged up to a certain electrical potential when the first TFT 16 is driven.

As shown in FIGS. 2 and 3, on the array substrate, gate lines 18 connected to the gate electrodes of the first TFTs 16; first source lines (first image lines) 19 connected to the source electrodes of the first TFTs 16; and a first pixel drive unit 20 connected to the gate lines 18 are provided. FIG. 2 shows a forming range of the first pixel drive unit 20 in hatching. The gate lines 18 extend along the X-axis direction in the first pixel area AA1, whereas the first source lines 19 extend along the Y-axis direction in the first pixel area AA1 and intersect with the gate lines 18. The gate lines 18 are fed with signals for controlling the driving of the first TFTs 16 by the first pixel drive unit 20 to which the gate lines 18 are connected. The gate lines 18 are arranged side by side along the X-axis direction, and each gate line 18 is connected to the first TFTs 16 included in the first pixel sections 14 constituting one first pixel sections row, so that these first TFTs 16 are collectively driven on the basis of the signals transferred via the gate line 18. The number of gate lines 18 provided matches the number of arranged first pixel sections 14 with respect to the Y-axis direction. The first source lines 19 are connected to the driver 12 via lead lines 21 disposed in the non-display area NAA and capable of transferring first image signals fed from the driver 12. The first source lines 19 are arranged side by side along the Y-axis direction, and each first source line 19 is connected to the first TFTs 16 included in the first pixel sections 14 constituting one first pixel sections column. The number of first source lines 19 provided matches the number of arranged first pixel sections 14 with respect to the X-axis direction. The first pixel drive unit 20 is shaped substantially like a strip extending along the Y-axis direction near the middle positions in the first pixel area AA1 with respect to the X-axis direction and is monolithically formed on the array substrate, using, for example, the same semiconductor material as the channel sections of the first TFTs 16.

Figure 4:
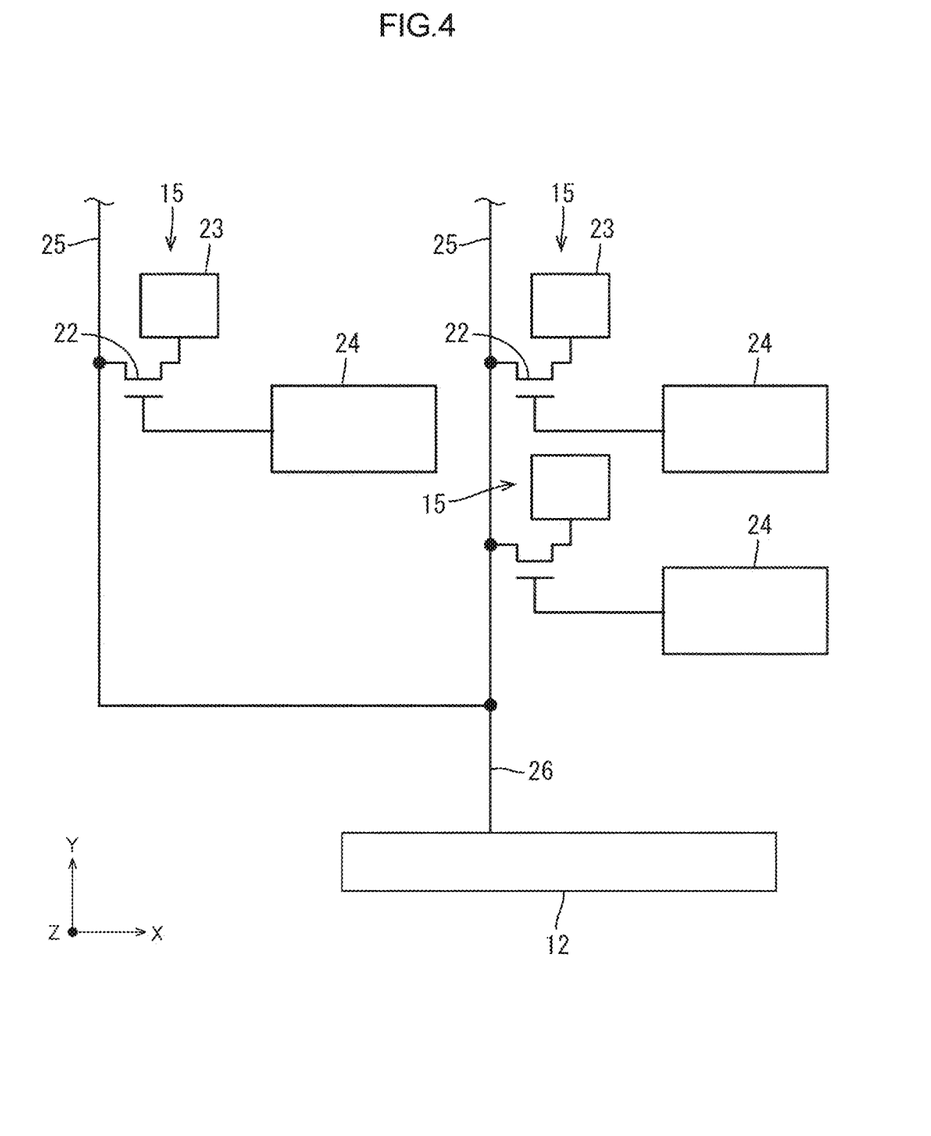
FIG. 4 is a circuit diagram of second pixel sections disposed in a second pixel area in the display area of the liquid crystal panel.

Referring to FIGS. 2 and 4, the second pixel sections 15 included in the array substrate include second TFTs 22 and second pixel electrodes 23 that are structured similarly to the first TFTs 16 and the first pixel electrodes 17 in the first pixel sections 14. FIG. 4 shows, as an example, some of the second pixel sections 15 disposed in the second pixel areas AA2. On the array substrate, second pixel drive units 24 connected to gate electrodes of the second TFTs 22; and second source lines (second image lines) 25 connected to source electrodes of the second TFTs 22 are provided. FIG. 2 shows a forming range of the second pixel drive units 24 in hatching. Each second pixel drive unit 24 is shaped substantially like a strip extending along the Y-axis direction near the middle positions in the second pixel sections 15 with respect to the X-axis direction and is monolithically formed on the array substrate, using, for example, the same semiconductor material as the channel sections of the first and second TFTs 16 and 22. The second pixel drive units 24 are connected individually to the second TFTs 22. The second pixel drive units 24 are capable of supplying signals for controlling the driving of the second TFTs 22 to the gate electrodes of the second TFTs 22. The second source lines 25 are disposed to extend along the Y-axis direction in the second pixel areas AA2. The second source lines 25 are arranged side by side along the Y-axis direction, and each second source line 25 is connected to the second TFTs 22 included in the second pixel sections 15 constituting one second pixel sections column. The number of second source lines 25 provided in the second pixel areas AA2 matches the number of arranged second pixel sections 15 with respect to the X-axis direction.

Still referring to FIGS. 2 and 4, in the non-display area NAA on the array substrate, short-circuit lines 26 for short-circuiting the second source lines 25 are provided. The short-circuit lines 26 are disposed in those parts of the non-display area NAA that are located on the driver 12 side relative to the second pixel areas AA2 with respect to the Y-axis direction, in other words, in the inclined portions NAA1. The short-circuit lines 26 extend along the inclined portion NAA1 and are connected to all the second source lines 25 disposed in the second pixel areas AA2 and also to the driver 12. The short-circuit lines 26 are hence capable of transferring second image signals fed from the driver 12 to the second source lines 25. The short-circuit lines 26 are disposed in the two inclined portions NAA1 in the non-display area NAA, and short-circuit the second source lines 25 disposed in the second pixel areas AA2. Since the short-circuit lines 26 short-circuit the second source lines 25 connected to the second pixel sections 15 disposed in the second pixel areas AA2 as described here, the inclined portions NAA1 are narrower in this structure than in a structure in which the second source lines are individually connected to the driver 12. In addition, when compared with a conventional structure in which some selectors are disposed on the second side on the opposite side of the source circuit, this structure needs no such selector and hence further narrows those parts of the non-display area NAA that are located on the opposite side of the second pixel areas AA2 from the inclined portions NAA1 with respect to the Y-axis direction.

The present embodiment is structured as described above. A detailed description will be given next of control of display on the liquid crystal display device 10. Throughout the following, when there is a need to identify the locations of the first pixel sections 14 and the second pixel sections 15 in the display area AA, the columns are numbered one by one starting from the far left shown in FIG. 2 from column 1 to column 15 with respect to the X-axis direction, and the rows are numbered one by one starting from the top shown in FIG. 2 from row 1 to row 5 with respect to the Y-axis direction. Therefore, those second pixel sections 15 that are disposed in the second pixel area AA2 in the left of FIG. 2 reside in column 1 to column 5, those first pixel sections 14 that are disposed in the first pixel area AA1 reside in column 6 to column 10, and those second pixel sections 15 that are disposed in the second pixel area AA2 in the right of FIG. 2 reside in column 11 to column 15.

First, an outline will be given of the control of the display on the liquid crystal display device 10. The pixel drive units 20 and 24 sequentially drive the pixel sections 14 and 15 in row 1 to row 5, and at the same time image signals are supplied to the source lines 19 and 25, thereby charging the pixel sections 14 and 15 to prescribed electrical potentials. One image is thus displayed on the display area AA. The time taken to display one image is termed a single frame display period.

Figure 5:
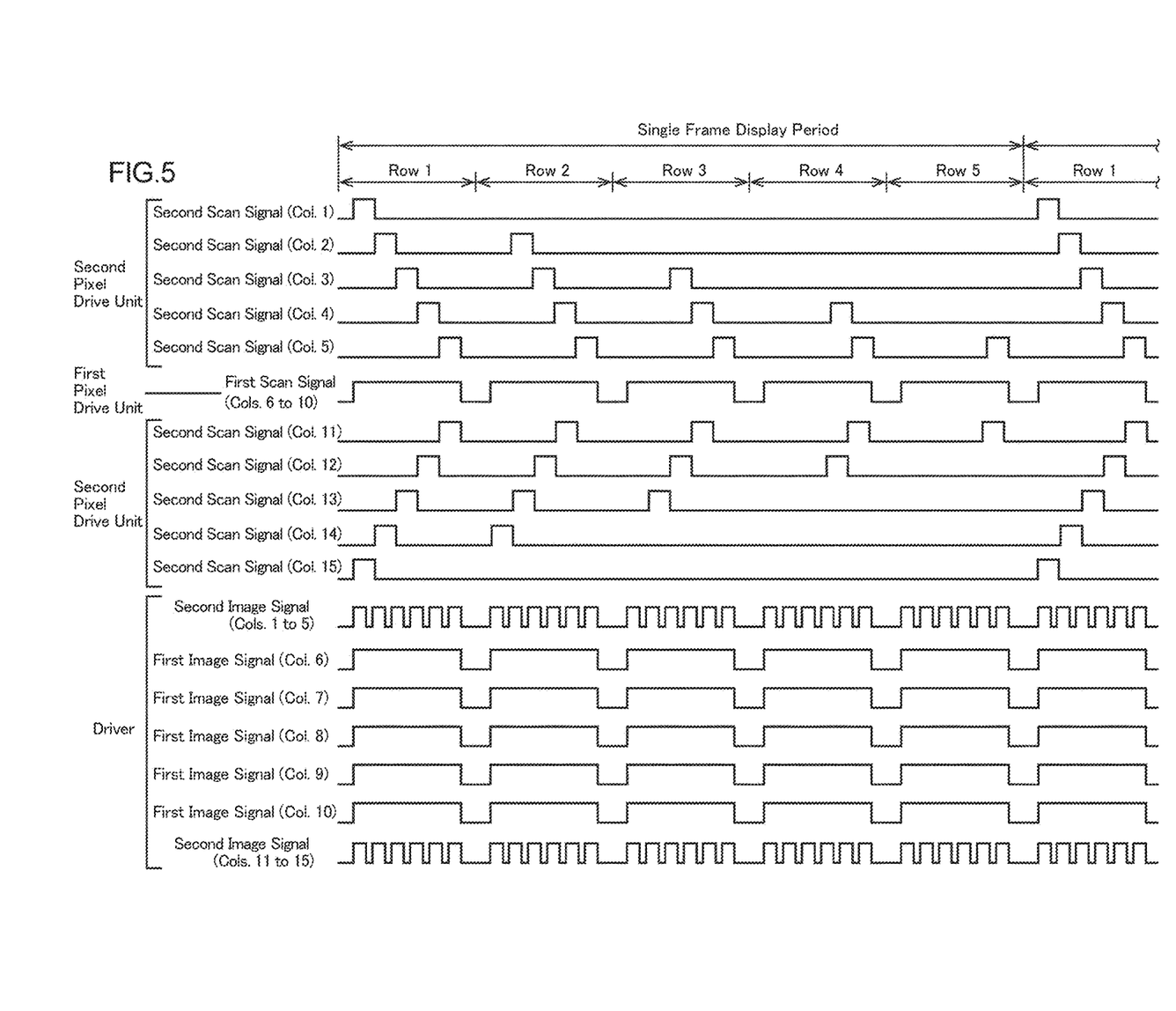
FIG. 5 is a timing chart for control of display on the liquid crystal display device.

A detailed description will be given next of the control of the display during a single frame display period with reference to FIG. 5. FIG. 5 shows waveforms related to drive signals (scan signals) supplied from the pixel drive units 20 and 24 to the pixel sections 14 and 15 in a simplified form and waveforms related to image signals supplied from the driver 12 to the pixel sections 14 and 15 via the source lines 19 and 25 in a simplified form. FIG. 5 further shows a supply source for each signal and the number of the column (in parentheses) where the pixel sections 14 and 15 that are supply targets of signals reside. To turn on the pixel sections 14 and 15 in row 1, first scan signals are supplied in batch from the first pixel drive unit 20 via the gate lines 18 to all the first pixel sections 14 disposed in row 1 and column 6 to column 10. In synchronism with this, second scan signals are supplied by time division from the individually connected, second pixel drive units 24 to the second pixel sections 15 disposed in row 1 and column 1 to column 5 and column 11 to column 15, thereby driving the second pixel sections 15 in a prescribed sequence. In doing so, the second pixel sections 15 in column 1 and column 15 are driven at the same timing, the second pixel sections 15 in column 2 and column 14 are driven at the same timing, the second pixel sections 15 in column 3 and column 13 are driven at the same timing, the second pixel sections 15 in column 4 and column 12 are driven at the same timing, and the second pixel sections 15 in column 5 and column 11 are driven at the same timing. A period during which the second scan signal is supplied to each of the second pixel sections 15 in these columns is approximately ⅕ of a period during which the first scan signal is supplied to each of the first pixel sections 14, in other words, equal to the reciprocal of the number of arranged second pixel sections 15 in the second pixel area AA2 with respect to the X-axis direction (the number of time divisions for the second scan signal).

As described earlier, the first image signals are supplied from the driver 12 to the first source lines 19 in synchronism with the driving of the first pixel sections 14 disposed in row 1 and column 6 to column 10 by the first pixel drive unit 20. The second image signals are then supplied by time division from the driver 12 to the short-circuit lines 26 in synchronism with the driving of the second pixel sections 15 disposed in row 1 and column 1 to column 5 and column 11 to column 15 by the second pixel drive units 24. To describe it in more detail, the second image signals fed from the driver 12 to the short-circuit lines 26 at the same timing as the driving of the second pixel sections 15 in column 1 and column 15 are supplied selectively to the second pixel sections 15 in column 1 and column 15 via the second source lines 25. Subsequently, the second image signals fed from the driver 12 to the short-circuit lines 26 at the same timing as the driving of the second pixel sections 15 in column 2 and column 14 are supplied selectively to the second pixel sections 15 in column 2 and column 14 via the second source lines 25. Then, likewise, the second pixel sections 15 in column 3 and column 13, the second pixel sections 15 in column 4 and column 12, and the second pixel sections 15 in column 5 and column 11 are charged in this sequence to potentials based on the respective, second image signals supplied thereto. A period during which the second image signal is supplied to each of the short-circuit lines 26 (second image signal supply period) is approximately ⅕ of a period during which the first image signal is supplied to each of the first source lines 19 (first image signal supply period), in other words, equal to the reciprocal of the number of arranged second pixel sections 15 in the second pixel area AA2 with respect to the X-axis direction (the number of time divisions for the second scan signal). The first pixel sections 14 and the second pixel sections 15 disposed in row 1 are thus charged to respective prescribed potentials. This series of actions are repeatedly performed on row 2 to row 5, thereby displaying one image in the display area AA. In this structure, the second pixel sections 15 connected to the second source lines 25 can be hence charged to different potentials in a single frame display period even when the short-circuit lines 26 are short-circuited by the second source lines 25.

As described above, the liquid crystal display device (display device) 10 in accordance with the present embodiment includes: a plurality of first pixel sections 14 arranged side by side at least in a column direction; a plurality of second pixel sections 15 arranged along a row direction and the column direction in a second pixel area AA2 located on an end side relative to a first pixel area AA1 with respect to the row direction, the first pixel sections 14 being disposed in the first pixel area AA1; first source lines (first image lines) 19 disposed in the first pixel area AA1, the first source lines 19 being connected to the first pixel sections 14 arranged side by side along the column direction; a plurality of second source lines (second image lines) 25 disposed in the second pixel area AA2, the second source lines being connected to the second pixel sections 15 arranged side by side along the column direction or one of the second pixel sections 15; short-circuit lines 26 connected to the second source lines 25, the short-circuit lines 26 short-circuiting the second source lines 25; a first pixel drive unit 20 disposed in the first pixel area AA1, the first pixel drive unit 20 driving the first pixel sections 14; a plurality of second pixel drive units 24 disposed in the second pixel area AA2, the second pixel drive units 24 driving the second pixel sections 15 arranged side by side along the row direction by time division while the first pixel drive unit 20 is driving the first pixel sections 14; and a driver (image signal supply section) 12 connected to the first source lines 19 and the short-circuit lines 26, the driver 12 supplying first image signals to the first source lines 19 in synchronism with the first pixel drive unit 20 driving the first pixel sections 14 and supplying second image signals to the short-circuit lines 26 by time division in synchronism with the second pixel drive units 24 driving the second pixel sections 15 arranged side by side along the row direction.

In this structure, when the first pixel sections 14 are driven by the first pixel drive unit 20, the first image signals are supplied from the driver 12 to the first source lines 19 in synchronism with this driving, thereby causing the first pixel sections 14 to be charged to electrical potentials based on the first image signals. Since those second pixel sections 15 that are arranged side by side along the row direction are driven by the second pixel drive units 24 by time division while the first pixel drive unit 20 is driving the first pixel sections 14, the second image signals are supplied from the driver 12 to the short-circuit lines 26 by time division in synchronism with this driving. Then, the second image signals are supplied by time division to the second source lines 25 short-circuited by the short-circuit lines 26, and additionally the second pixel sections 15 connected to the respective second source lines 25 and arranged side by side along the row direction are charged to respective electrical potentials based on the second image signals. Since the second source lines 25 connected to the second pixel sections 15 disposed in the second pixel area AA2 located on the end side relative to the first pixel area AA1 with respect to the row direction are short-circuited by the short-circuit lines 26, the driver 12 side part of the frame portion of the second pixel area AA2 is narrowed compared with a structure in which the second source lines are connected to the driver 12. In addition, when compared with a conventional structure in which some selectors are disposed on the second side on the opposite side of the source circuit, this structure needs no such selector and hence further narrows those parts of the frame portion of the second pixel area AA2 that are located on the opposite side from the driver 12.

The second pixel sections 15 are disposed such that the number of arranged second pixel sections 15 with respect to the column direction decreases on moving toward the end side with respect to the row direction. In this structure, the second pixel area AA2 has a column-direction dimension decreasing on moving toward the end side with respect to the row direction. The second pixel area AA2 therefore has a non-rectangular shape in a plan view. The frame portion of the second pixel area AA2 with such a planar shape is narrowed with respect to the column direction both on the driver 12 side and on the opposite side thereof, which enables an excellent appearance.

The second pixel sections 15 are disposed such that the number of arranged second pixel sections 15 with respect to the row direction decreases on moving toward the driver 12 side with respect to the column direction. In this structure, those parts of the frame portion of the second pixel area AA2 that are on the driver 12 side with respect to the column direction are efficiently narrowed compared with a structure in which the second pixel sections 15 are disposed such that the number of arranged second pixel sections 15 with respect to the row direction increases on moving toward the driver 12 side with respect to the column direction, which enables a more excellent appearance.

The second pixel sections 15 are disposed such that the second pixel area AA2 is divided into two areas sandwiching the first pixel area AA1 with respect to the row direction. In this structure, the two second pixel areas AA2 sandwiching the first pixel area AA1 with respect to the row direction have a non-rectangular shape in a plan view. However, the frame portions of these two second pixel areas AA2 are narrowed with respect to the column direction both on the driver 12 side and on the opposite side thereof, which enables an even more excellent appearance.

The first pixel sections 14 are arranged side by side along the row direction in the first pixel area AA1, and the first pixel drive unit 20 collectively drives these first pixel sections 14 arranged side by side along the row direction. In this structure, the second pixel drive units 24 drives the second pixel sections 15 arranged side by side along the row direction by time division while the first pixel drive unit 20 is collectively driving the first pixel sections 14 arranged side by side along the row direction.

Embodiment 2

A description will be given of Embodiment 2 of the disclosure with reference to FIG. 6. Present Embodiment 2 describes a different method of controlling display. No description will be repeated on the same structure, operation, and effects as those in the Embodiment 1 above.

Figure 6:
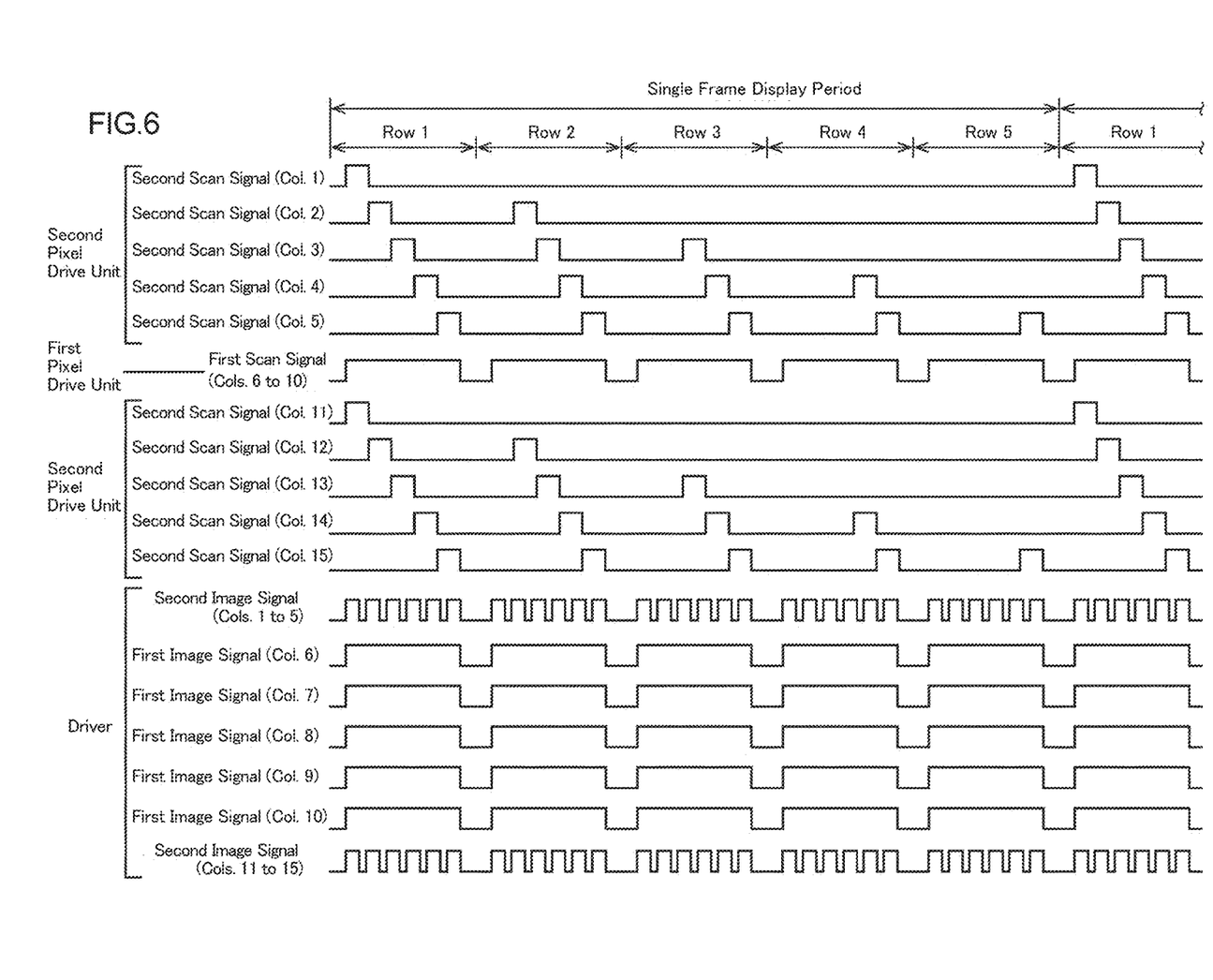
FIG. 6 is a timing chart for control of display on a liquid crystal display device in accordance with Embodiment 2 of the disclosure.

FIG. 6 illustrates control of display in a liquid crystal display device in accordance with the present embodiment. Specifically, the second pixel sections in column 1 and column 11 are driven by the second pixel drive units at the same timing, the second pixel sections in column 2 and column 12 are driven by the second pixel drive units at the same timing, the second pixel sections in column 3 and column 13 are driven by the second pixel drive units at the same timing, the second pixel sections in column 4 and column 14 are driven by the second pixel drive units at the same timing, and the second pixel sections in column 5 and column 15 are driven by the second pixel drive units at the same timing. Accordingly, the second pixel sections in column 1 and column 11, the second pixel sections in column 2 and column 12, the second pixel sections in column 3 and column 13, the second pixel sections in column 4 and column 14, and the second pixel sections in column 5 and column 15 are charged in this sequence to potentials based on the respective, second image signals supplied thereto.

Other Embodiments

The disclosure is by no means limited to the embodiments described above with reference to the drawings. The disclosure has a technical scope that encompasses, for example, the following embodiments.

(1) The number of arranged first pixel sections in the first pixel area with respect to the X-axis direction and the number of arranged first pixel sections in the first pixel area with respect to the Y-axis direction and/or the number of arranged second pixel sections in the second pixel area with respect to the X-axis direction and the number of arranged second pixel sections in the second pixel area with respect to the Y-axis direction may be modified as appropriate other than the examples given above in the embodiments with reference to the drawings. For instance, the number of arranged first pixel sections in each column with respect to the X-axis direction may not be the same. In addition, the number of arranged first pixel sections in each row with respect to the X-axis direction may not be the same. The number of arranged second pixel sections in each row with respect to the Y-axis direction may not be different. Additionally, the number of arranged second pixel sections with respect to the Y-axis direction in the column located at the end with respect to the X-axis direction (in column 1 and/or column 15) may be two or more. The number of arranged second pixel sections with respect to the X-axis direction in the row located on the driver-side end with respect to the Y-axis direction (row 5) may be two or more. Furthermore, the number of arranged second pixel sections with respect to the Y-axis direction in the column located on the end side with respect to the X-axis direction may be larger than the number of arranged second pixel sections with respect to the Y-axis direction in the column located on the center side with respect to the X-axis direction. In addition, the number of arranged second pixel sections with respect to the X-axis direction in the row located on the driver side with respect to the Y-axis direction may be larger than the number of arranged second pixel sections with respect to the X-axis direction in the row located on the opposite side from the driver with respect to the Y-axis direction.

(2) The embodiments above describe the examples where the liquid crystal panel and the display area are shaped like a reverse isosceles trapezoid in a plan view. Specific planar shapes of the liquid crystal panel and the display area may be modified as appropriate, and may be a reverse non-isosceles trapezoid, a parallelogram, an isosceles trapezoid, a non-isosceles trapezoid, or the like.

(3) The embodiments above describe the examples where the first pixel area is shaped like a square in a plan view. A specific planar shape of the first pixel area may be modified as appropriate, and may be a horizontally elongated rectangle, a vertically elongated rectangle, or the like.

(4) The embodiments above describe the examples where the second pixel areas are shaped like a right triangle in a plan view. A specific planar shape of the second pixel area may be modified as appropriate, and may be an isosceles triangle, an equilateral triangle, a trapezoid, or the like.

(5) The embodiments above describe the examples where the two second pixel areas are shaped to be linearly symmetric. The two second pixel areas may be shaped to be non-linearly symmetric. As a further alternative, the two second pixel areas may have different areas (may include different numbers of second pixel sections).

(6) The embodiments above describe the examples where the two second pixel areas are disposed to sandwich the first pixel area. A single second pixel area may be disposed adjacent to a side of the first pixel area.

(7) The embodiments above describe the examples where a single driver is mounted in the liquid crystal panel. A plurality of drivers may be mounted in the liquid crystal panel.

(8) The embodiments above describe the examples where the liquid crystal panel is of a transmissive type. The liquid crystal panel may be of a reflective type or of a transflective type.

(9) The embodiments above describe the examples where the TFTs are used as switching elements for the liquid crystal display device. It is also applicable to liquid crystal display devices including non-TFT switching elements (e.g., thin film diodes (TFDs)). It is applicable to black and white liquid crystal display devices, as well as to color liquid crystal display devices.

(10) The embodiments above describe the examples where the display panel is a liquid crystal panel. The display panel may be a different type of display panel (e.g. an organic EL display panel).

The invention claimed is:

1. A display device comprising:
a plurality of first pixel sections arranged side by side at least along a column direction;
a plurality of second pixel sections arranged along a row direction and the column direction in a second pixel area located on an end side relative to a first pixel area with respect to the row direction, the first pixel sections being disposed in the first pixel area;
first image lines disposed in the first pixel area, the first image lines being connected to the first pixel sections arranged side by side along the column direction;
a plurality of second image lines disposed in the second pixel area, the second image lines being connected to the second pixel sections arranged side by side along the column direction or one of the second pixel sections;
short-circuit lines connected to the second image lines, the short-circuit lines short-circuiting the second image lines;
a first pixel drive unit disposed in the first pixel area, the first pixel drive unit driving the first pixel sections;
a plurality of second pixel drive units disposed in the second pixel area, the second pixel drive units driving the second pixel sections arranged side by side along the row direction by time division while the first pixel drive unit is driving the first pixel sections; and
an image signal supply section connected to the first image lines and the short-circuit lines, the image signal supply section supplying first image signals to the first image lines in synchronism with the first pixel drive unit driving the first pixel sections and supplying second image signals to the short-circuit lines by time division in synchronism with the second pixel drive units driving the second pixel sections arranged side by side along the row direction, wherein
the first pixel drive unit is substantially strip-shaped and extends along the column direction adjacent to a middle position with respect to the row direction and is a gate driver monolithically defined on an array substrate, and
each of the plurality of second pixel drive units are substantially strip-shaped and extend along the column direction within the plurality of second pixel sections with respect to the row direction and are gate drivers monolithically defined on the array substrate.

2. The display device according to claim 1, wherein the second pixel sections are disposed such that a number of arranged second pixel sections with respect to the column direction decreases on moving toward an end side with respect to the row direction.

3. The display device according to claim 2, wherein the second pixel sections are disposed such that a number of arranged second pixel sections with respect to the row direction decreases on moving toward the image signal supply section in the column direction.

4. The display device according to claim 2, wherein the second pixel sections are disposed such that the second pixel area is divided into two areas sandwiching the first pixel area with respect to the row direction.

5. The display device according to claim 1, wherein
the first pixel sections are arranged side by side along the row direction in the first pixel area, and
the first pixel drive unit collectively drives the first pixel sections arranged side by side along the row direction.

* * * * *